United States Patent
Kim et al.

(10) Patent No.: US 10,854,149 B2
(45) Date of Patent: Dec. 1, 2020

(54) METHOD OF DRIVING LIGHT-SOURCE WITH IMPROVED CONTRAST RATIO AND DISPLAY APPARATUS FOR PERFORMING THE METHOD

(71) Applicant: Samsung Display Co., Ltd., Yongin-Si (KR)

(72) Inventors: Seung-Wan Kim, Asan-si (KR); Min-Soo Choi, Asan-si (KR); Gwang-Teak Lee, Cheonan-si (KR); Tae-Gon Im, Siheung-si (KR); Myoung-Soo Kim, Asan-si (KR); Hwan-Woong Lee, Asan-si (KR); Seung-Young Choi, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 211 days.

(21) Appl. No.: 15/374,016

(22) Filed: Dec. 9, 2016

(65) Prior Publication Data

US 2017/0092204 A1 Mar. 30, 2017

Related U.S. Application Data

(62) Division of application No. 13/742,519, filed on Jan. 16, 2013, now Pat. No. 9,548,021.

(30) Foreign Application Priority Data

Jun. 1, 2012 (KR) .................. 10-2012-0059078
Aug. 23, 2012 (KR) .................. 10-2012-0092157

(51) Int. Cl.
*G09G 3/34* (2006.01)
*G09G 3/3233* (2016.01)
(Continued)

(52) U.S. Cl.
CPC ......... *G09G 3/3426* (2013.01); *G09G 3/3233* (2013.01); *G09G 5/10* (2013.01);
(Continued)

(58) Field of Classification Search
CPC ......... G09G 3/3406; G09G 2320/0626; G09G 2320/064; G09G 2320/0646
See application file for complete search history.

(56) References Cited

U.S. PATENT DOCUMENTS 5,859,571 A * 1/1999 Lee .................. G11C 11/5628
331/111
7,928,670 B2 4/2011 Chen et al.
(Continued)

FOREIGN PATENT DOCUMENTS

KR 1020080062385 A 7/2008
KR 100858691 B1 9/2008
(Continued)

OTHER PUBLICATIONS

Korean Office Action for Application No. 10-2012-0092157 dated Jan. 3, 2019 enumerating the above identified references cited in the Korean Office Action.

*Primary Examiner* — Ram A Mistry
(74) *Attorney, Agent, or Firm* — Cantor Colburn LLP

(57) ABSTRACT

A method of driving a light-source module includes adjusting a frequency of a boosting switching signal based on a dimming signal which controls luminance of a light-emitting diode ("LED") string of the light-source module, where the LED string comprises a plurality of LEDs connected to each other in series, and controlling a main transistor in response to the boosting switching signal to transfer a driving voltage to the LED string.

8 Claims, 10 Drawing Sheets

(51) Int. Cl.
  *H05B 45/00* (2020.01)
  *H05B 45/10* (2020.01)
  *H05B 45/37* (2020.01)
  *G09G 5/10* (2006.01)

(52) U.S. Cl.
  CPC ............ *H05B 45/00* (2020.01); *H05B 45/10* (2020.01); *H05B 45/37* (2020.01); *G09G 2300/023* (2013.01); *G09G 2310/0289* (2013.01); *G09G 2310/06* (2013.01); *G09G 2320/064* (2013.01); *G09G 2360/16* (2013.01)

(56) References Cited

U.S. PATENT DOCUMENTS

| | | | |
|---|---|---|---|
| 8,866,727 | B2 | 10/2014 | Choi et al. |
| 9,013,393 | B2 | 4/2015 | Um et al. |
| 9,035,560 | B2 | 5/2015 | Li et al. |
| 2004/0183822 | A1 | 9/2004 | Woo |
| 2009/0225021 | A1 | 9/2009 | Ye et al. |
| 2009/0267530 | A1* | 10/2009 | Yang .................. H05B 33/0818 315/250 |
| 2010/0013871 | A1* | 1/2010 | Shen .................... G09G 3/3406 345/691 |
| 2011/0043139 | A1* | 2/2011 | Shiu .................... H05B 33/089 315/307 |
| 2011/0122170 | A1* | 5/2011 | Kim .................... G09G 3/3406 345/690 |
| 2011/0140621 | A1 | 6/2011 | Yi et al. |
| 2011/0267377 | A1 | 11/2011 | Kim et al. |
| 2012/0074860 | A1 | 3/2012 | Lee |

FOREIGN PATENT DOCUMENTS

| | | |
|---|---|---|
| KR | 1020100020326 A | 2/2010 |
| KR | 1020100062475 A | 6/2010 |
| KR | 1020110010227 A | 2/2011 |
| KR | 1020110015037 A | 2/2011 |
| KR | 1020120032079 A | 4/2012 |

\* cited by examiner

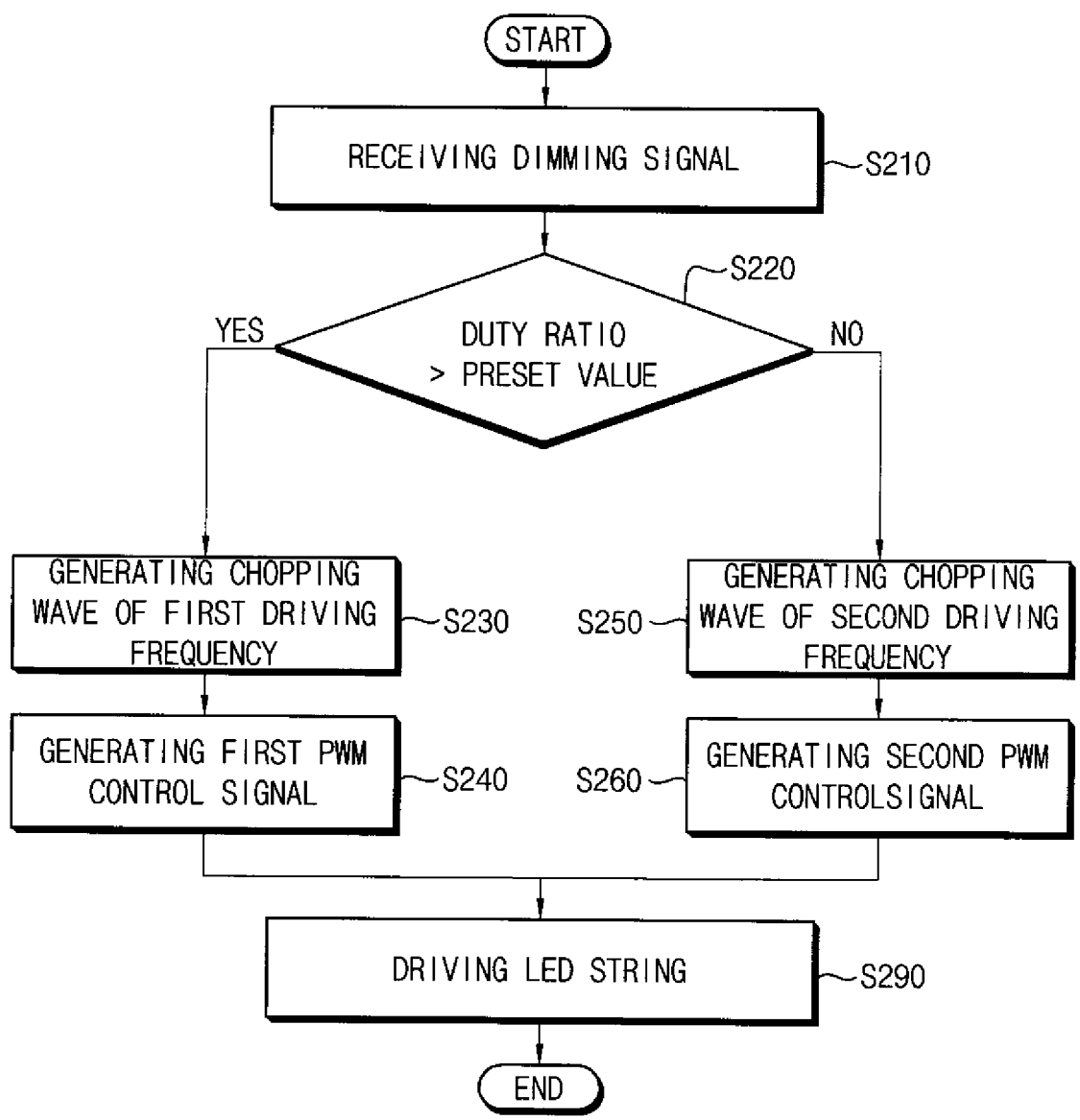

< Duty 1%, Frequency 12kHz, Target CURRENT 110mA >

< Duty 1%, Frequency 80kHz, Target CURRENT 110mA >

METHOD OF DRIVING LIGHT-SOURCE WITH IMPROVED CONTRAST RATIO AND DISPLAY APPARATUS FOR PERFORMING THE METHOD

This application is a divisional of U.S. patent application Ser. No. 13/742,519, filed on Jan. 16, 2013, which claims priority to Korean Patent Applications No. 10-2012-0059078, filed on Jun. 1, 2012, and Korean Patent Applications No. 10-2012-0092157, filed on Aug. 23, 2012, and all the benefits accruing therefrom under 35 U.S.C. § 119, the contents of which in their entireties are hereby incorporated by reference.

BACKGROUND

1. Field

Exemplary embodiments of the invention relate to a method of driving a light-source, and a display apparatus for performing the method of driving the light-source. More particularly, exemplary embodiments of the invention relate to a method of driving a light-source with improved contrast ratio, and a display apparatus for performing the method of driving the light-source.

2. Description of the Related Art

Generally, a liquid crystal display ("LCD") apparatus includes an LCD panel that displays an image using optical transmittance of liquid crystal molecules and a backlight assembly disposed below the LCD panel to provide the LCD panel with light.

The LCD panel includes an array substrate, a color filter substrate and a liquid crystal layer. The array substrate includes a plurality of pixel electrodes and a plurality of thin-film transistors ("TFTs") electrically connected to the pixel electrodes. The color filter substrate faces the array substrate and has a common electrode and a plurality of color filters. The liquid crystal layer is interposed between the array substrate and the color filter substrate. When an electric field generated between the pixel electrode and the common electrode is applied to the liquid crystal layer, the arrangement of liquid crystal molecules of the liquid crystal layer is altered to change the optical transmissivity of the liquid crystal layer, such that an image is displayed on the LCD panel. The LCD panel displays a white image of a high luminance when an optical transmittance is increased to maximum, and the LCD panel displays a black image of a low luminance when the optical transmittance is decreased to minimum.

Recently, the backlight assembly includes a plurality of light-emitting diodes ("LEDs") as a light-source. Light emitted from the LEDs is controlled using a pulse width modulation ("PWM") dimming method based on luminance of an image displayed on the LCD panel. According to the PWM dimming method, a duty ratio of a pulse is adjusted to adjust an intensity of the light emitted from the LEDs. In the PWM dimming method, when the duty ratio of the pulse is less than about 2%, a high level of a current outputted from the LED is substantially decreased, and the LED is thereby not effectively controlled.

SUMMARY

Exemplary embodiments of the invention provide a method of driving a light-source with improved contrast ratio.

Exemplary embodiments of the invention also provide a display apparatus for performing the method of driving the light-source.

According to an exemplary embodiment of the invention, a method of driving a light-source module includes adjusting a frequency of a boosting switching signal based on a dimming signal which controls luminance of a light-emitting diode ("LED") string of the light-source module, where the LED string comprises a plurality of LEDs connected to each other in series, and controlling a main transistor in response to the boosting switching signal to transfer a driving voltage to the LED string.

In an exemplary embodiment, the adjusting the frequency of the boosting switching signal may include generating a chopping wave of a first driving frequency when a level of the dimming signal is greater than a preset value, and adjusting the frequency of the boosting switching signal to generate a first boosting switching signal using the chopping wave of the first driving frequency.

In an exemplary embodiment, the adjusting the frequency of the boosting switching signal may include generating a chopping wave of a second driving frequency higher than the first driving frequency when the level of the dimming signal is less than the preset value, and adjusting a frequency of the boosting switching signal to generate a second boosting switching signal using the chopping wave of the second driving frequency.

In an exemplary embodiment, the method may further include comparing an output current of the LED string with a reference signal to output the boosting switching signal.

According to an exemplary embodiment of the invention, a method of driving a light-source module includes adjusting a frequency of a pulse width modulation ("PWM") control signal having a current control pulse to control an LED string of the light-source module, where the LED string comprises a plurality of LEDs connected to each other in series, and controlling a control switching element which is connected to an end portion of the LED string in response to the PWM control signal.

In an exemplary embodiment, the adjusting a frequency of the PWM control signal may include generating a chopping wave of a first driving frequency when a level of the dimming signal which controls luminance of the LED string is greater than a preset value, and adjusting the frequency of the PWM control signal to generate a first PWM control signal using the chopping wave of the first driving frequency.

In an exemplary embodiment, the adjusting the frequency of the PWM control signal may include generating a chopping wave of a second driving frequency higher than the first driving frequency when a level of the dimming signal which controls luminance of the LED string is less than the preset value, and adjusting the frequency of the PWM control signal to generate a second PWM control signal using the chopping wave of the second driving frequency.

In an exemplary embodiment, the adjusting the frequency of the PWM control signal may include generating a chopping wave of a first driving frequency when a level of a detection voltage detected from the end portion of the LED string is substantially equal to a preset value, and adjusting the frequency of the PWM control signal to generate a first PWM control signal using the chopping wave of the first driving frequency.

In an exemplary embodiment, the adjusting the frequency of the PWM control signal may include generating a chopping wave of a second driving frequency when the level of the detection voltage is different from the preset value and adjusting the frequency of the PWM control signal to generate a second PWM control signal using the chopping wave of the second driving frequency.

According to an exemplary embodiment of the invention, a display apparatus includes a display panel configured to receive an image signal and to display an image corresponding to the received image signal, a light-source module including a light-emitting diode ("LED") string, wherein the LED string includes a plurality of LEDs connected to each other in series, and a light-source driving part including a main transistor, configured to adjust a frequency of a boosting switching signal based on a dimming signal, which controls luminance of the LED string, and configured to control the main transistor in response to the boosting switching signal to transfer a driving voltage to the LED string.

In an exemplary embodiment, the light-source driving part may include an image analyzing part configured to analyze the image signal and to determine a target luminance value of the LED string, a dimming level determining part configured to determine the dimming signal of the LED string using the target luminance value, and a driving signal generating part including the main transistor, configured to adjust the driving frequency of the boosting switching signal based on the dimming signal and configured to drive the main transistor in response to the boosting switching signal.

In an exemplary embodiment, the driving signal generating part may include a frequency oscillating part configured to generate a chopping wave, a frequency modulating part configured to modulate a driving frequency of the chopping wave to a first driving frequency or a second driving frequency higher than the first driving frequency, and a direct-current-to-direct-current converting part including the main transistor and configured to transfer the driving signal to the LED string in response to the first or second boosting switching signal based on the chopping wave of the first or second driving frequency.

In an exemplary embodiment, the frequency modulating part may include an input part configured to receive the dimming signal, a voltage dividing part configured to divide a voltage of the dimming signal, a diode part being connected to the input part and the voltage dividing part, an oscillating transistor configured to operate in response to a divided voltage received from the voltage dividing part, and a resistor part including a second resistor connected in parallel to a first resistor of the frequency oscillating part, which determines the driving frequency of the chopping wave.

In an exemplary embodiment, the display panel may be divided into a plurality of display blocks, the light-source module may include a plurality of light-emitting blocks, and each of the light-emitting blocks may include the LED string.

According to an exemplary embodiment of the invention, a display apparatus includes a display panel configured to receive an image signal and to display an image corresponding to the image signal, a light-source module including an LED string, where the LED string comprises a plurality of LEDs connected to each other in series, and a light-source driving part including a main transistor, configured to adjust a frequency of a PWM control signal having a current control pulse to control the LED string, and configured to control a control switching element, which is connected to an end portion of the LED string, in response to the PWM control signal.

In an exemplary embodiment, the light-source driving part may include an image analyzing part configured to analyze the image signal and to determine a target luminance value of the LED string, a dimming level determining part configured to determine the dimming signal of the LED string using the target luminance value, and a driving signal generating part including the main transistor, configured to adjust the driving frequency of the boosting switching signal based on the dimming signal and configured to drive the main transistor in response to the boosting switching signal.

In an exemplary embodiment, the driving signal generating part may include a frequency oscillating part configured to generate a chopping wave, a frequency modulating part configured to modulate a driving frequency of the chopping wave to a first driving frequency or a second driving frequency higher than the first driving frequency, based on the dimming signal which controls luminance of the LED string, and a constant current control part configured to generate first or second PWM control signal as the PWM control signal based on the chopping wave of the first or second driving frequency.

In an exemplary embodiment, the frequency modulating part may include an input part configured to receive the dimming signal, a voltage dividing part configured to divide a voltage of the dimming signal, a diode part connected to the input part and the voltage dividing part, an oscillating transistor configured to operate in response to a divided voltage received from the voltage dividing part, and a resistor part including a second resistor connected in parallel to a first resistor of the frequency oscillating part, which determines the driving frequency of the chopping wave.

In an exemplary embodiment, the driving signal generating part may include a frequency oscillating part configured to generate a chopping wave, a frequency modulating part configured to modulate a driving frequency of the chopping wave to a first driving frequency or a second driving frequency higher than the first driving frequency, based on a detection voltage detected from the end portion of the LED string, and a constant current control part configured to generate first or second PWM control signal as the PWM control signal based on the chopping wave of the first or second driving frequency.

In an exemplary embodiment, the frequency modulating part may include an input part configured to receive the detection voltage, a voltage dividing part configured to divide the detection voltage, a diode part connected to the input part and the voltage dividing part, an oscillating transistor configured to operate in response to a divided voltage received from the voltage dividing part, and a resistor part including a second resistor connected in parallel to a first resistor of the frequency oscillating part, which determines the driving frequency of the chopping wave.

According to the invention, when the dimming signal having the duty ratio which is less than about 1% is applied to the light-source module, the output current of the light-source module is effectively prevented from being decreased. Thus, luminance of the light-source module is effectively controlled, and a contrast ratio is thereby substantially improved.

BRIEF DESCRIPTION OF THE DRAWINGS

The above and other features of the invention will become more apparent by describing in detailed exemplary embodiments thereof with reference to the accompanying drawings, in which:

FIG. 6 is a flowchart diagram illustrating an exemplary embodiment of a method of driving the driving signal generating part shown in FIG. 5;

DETAILED DESCRIPTION

Figure 1:
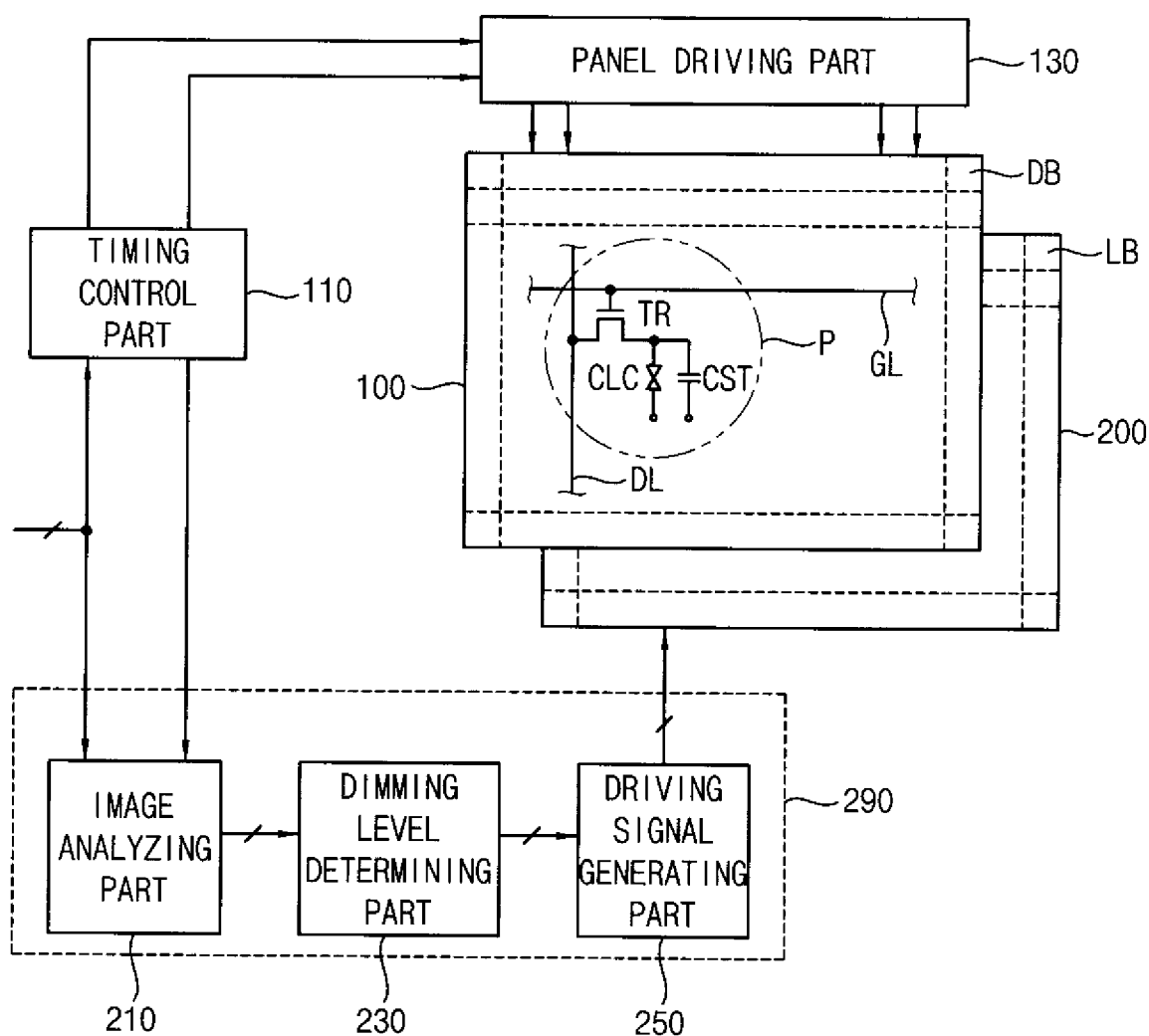
FIG. 1 is a block diagram illustrating an exemplary embodiment of a display apparatus according to the invention.

The invention will be described more fully hereinafter with reference to the accompanying drawings, in which exemplary embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

A technical term "viewing angle" is defined as the angle between the line of sight of the viewer viewing the screen and the tangent to the intersection between the line of sight and the observed screen surface, and the difference between the center and left/right edge viewing angles is defined as and used to mean the "viewing angle difference.

Hereinafter, exemplary embodiments of the invention will be explained in detail with reference to the accompanying drawings.

FIG. 1 is a block diagram illustrating an exemplary embodiment of a display apparatus according to the invention.

Referring to FIG. 1, the display apparatus may include a display panel 100, a timing control part 110, a panel driving part 130, a light-source module 200 and a light-source driving part 290.

The display panel 100 may include a plurality of pixels for displaying an image. In one exemplary embodiment, for example, the pixels may be arranged substantially in a matrix form, and the number of the pixels is M×N, where M and N are a natural number. Each pixel P includes a switching element TR connected to a gate line GL and a data line DL, a liquid crystal capacitor CLC connected to the switching element TR, and a storage capacitor Cst connected to the liquid crystal capacitor CLC.

The timing control part 110 may receive a synchronization signal and an image signal from an external device. The timing control part 110 generates a timing control signal to control a driving timing of the display panel 100 using the synchronization signal. The timing control signal may include a clock signal, a horizontal synchronization signal and a vertical synchronization signal, for example.

The panel driving part 130 drives the display panel 100 using the synchronization signal and the image signal received from the timing control part 110. In one exemplary embodiment, for example, the panel driving part 130 includes a gate driving part and a data driving part. The gate driving part may generate a gate signal, which is applied to the gate line GL, using the vertical synchronization signal. The data driving part may generate a data signal, which is applied to the data line DL, using the horizontal synchronization signal.

The light-source module 200 provides the display panel 100 with light. The light-source module 200 includes a light-emitting block LB, and the light-emitting block LB includes a light-emitting diode ("LED") string. The LED string includes a plurality of LEDs connected to each other in series. The light-source module 200 may include a plurality of light-emitting blocks LB. An intensity of light emitted from a light-emitting block LB may be determined based on luminance of an image which is displayed on a corresponding display block DB in the display panel 100. The light-emitting blocks LB may be arranged in a linear form or a matrix form. The light-emitting blocks LB may be driven in a local dimming mode.

The light-source driving part 290 may include an image analyzing part 210, a dimming level determining part 230 and a driving signal generating part 250.

The image analyzing part 210 determines a target luminance value using the synchronization signal and the image signal.

The dimming level determining part 230 generates a dimming signal which controls the intensity of the light emitted from the light-source module 200 using the target luminance value.

An exemplary embodiment of a method of driving the light-source module 200 may include a global dimming method that adjusts the luminance of the overall display screen and a local dimming method that divides the display screen into a plurality of blocks and independently adjusts the luminance of the blocks. In an exemplary embodiment, the dimming method may include a pulse width modulation ("PWM") dimming method which uses the dimming signal as a PWM dimming signal and an analog dimming method which uses the dimming signal as a direct current ("DC") signal. In the PWM dimming method, the duty ratio of a pulse signal is controlled to thereby control the luminance of the light-emitting block. In the analog dimming method, a voltage level of the DC signal is controlled to thereby control the luminance of the light-emitting block. The PWM dimming method may include an external dimming method which receives the pulse signal from an external and an internal dimming method which receives a DC signal and then converts the DC signal into the pulse signal. Hereinafter, an exemplary embodiment where the PWM dimming method is used will be described in greater detail.

In such an embodiment, the driving signal generating part 250 provides the light-source module 200 with a driving voltage using the dimming signal.

In such an embodiment, the driving signal generating part 250 provides the light-source module 200 with the driving voltage in response to a first boosting switching signal having a first driving frequency, when the duty ratio of the dimming signal, that is, a level of the dimming signal, is greater than a preset value. The driving signal generating part 250 provides the light-source module 200 with the driving voltage in response to a second boosting switching signal having a second driving frequency higher than the first driving frequency, when the duty ratio of the dimming signal is less than the preset value. In an exemplary embodiment, the preset value may correspond to the duty ratio in a range of about 1% to about 2%, but not being limited thereto.

Therefore, when the dimming signal having the duty ratio less than the preset value is applied to the light-source module 200, the driving signal generating part 250 increases the number of times of providing the light-source module 200 with the driving voltage. Accordingly, the driving signal generating part 250 effectively prevents an output current of the light-source module 200 from falling.

Figure 2:
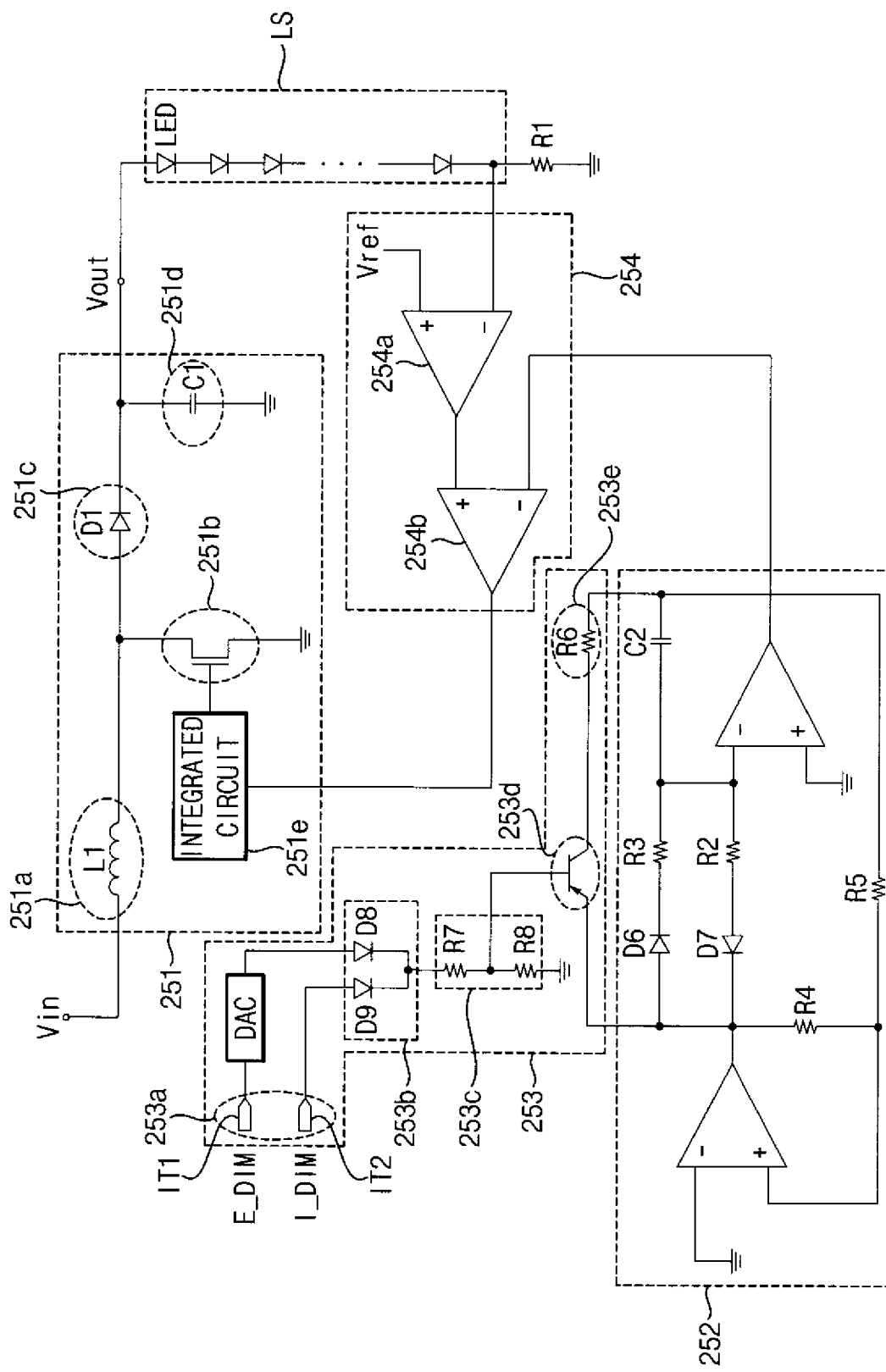
FIG. 2 is a circuit diagram illustrating an exemplary embodiment of a driving signal generating part shown in FIG. 1.

FIG. 2 is a circuit diagram illustrating an exemplary embodiment of a driving signal generating part shown in FIG. 1.

Referring to FIGS. 1 and 2, the display apparatus may include the driving signal generating part 250 and the light-source module 200. The light-emitting block included in the light-source module 200 may be individually driven, e.g., driven independent of each other, and may include a LED string LS.

The driving signal generating part 250 may include a direct-current-to-direct-current ("DC/DC") converting part 251, frequency oscillating part 252, a frequency modulating part 253 and a current feedback part 254.

The DC/DC converting part 251 includes a boosting part 251a, a main transistor 251b, a rectification part 251c, a charging part 251d and an integrated circuit 251e. The boosting part 251a includes an inductor L1. The boosting part 251a boosts up an input voltage Vin to generate a driving voltage Vout based on an operation of the main transistor 251b. The main transistor 251b includes a control electrode connected to the integrated circuit 251e, an input electrode connected to the boosting part 251a and an output electrode connected to a ground. The main transistor 251b turns on or turns off in response to a boosting switching signal received from the integrated circuit 251e. The rectification part 251c may include a diode D1, and is connected to the boosting part 251a and the charging part 251d. The charging part 251d may include a capacitor C1 and is connected to the rectification part 251c and an end portion of the LED string LS to charge the driving voltage Vout.

The integrated circuit 251e performs a boosting operation and a dimming operation to drive the LED string LS. In one exemplary embodiment, for example, the integrated circuit 251e controls the main transistor 251b based on the boosting switching signal received from the current feedback part 254.

The frequency oscillating part 252 generates an oscillating wave, which is a chopping wave. In an exemplary embodiment, the frequency oscillating part 252 selectively generates one of chopping waves having a first driving frequency and a second driving frequency higher than the first driving frequency based on a control of the frequency modulating part 253.

The frequency oscillating part 252 may include a plurality of operational ("OP") amplifiers, a plurality of resistors R2, R3, R4 and R5, a plurality of diodes D6 and D7 and a capacitor C2, but not being limited thereto. In one exemplary embodiment, for example, the frequency oscillating part 252 may generate the chopping wave having a driving frequency $f_{op}$ using the following Equation (1).

$$f_{op} = \frac{K}{R_{RT}[k\Omega]} \quad (1)$$

In Equation 1, K is a constant, and $R_{RT}$ denotes a resistance in kiloohm (kΩ) of a first resistor R3 included in the frequency oscillating part 252. In Equation 1, the driving frequency $f_{op}$ of the chopping wave may be determined by the resistance of the first resistor R3.

The frequency modulating part 253 may include an input part 253a, a diode part 253b, a voltage dividing part 253c, an oscillating transistor 253d and a resistor part 253e, and modulates the driving frequency of the chopping wave based on a level of the dimming signal.

The input part 253a includes a first input terminal IT1 which receives an external dimming signal E_DIM and a second input terminal IT2 which receives an internal dimming signal I_DIM. The frequency modulating part 253 further include a digital-to-analog convertor DAC which is connected to the first input terminal IT1. The external dimming signal E_DIM is an alternating current signal including a pulse. The digital-to-analog convertor DAC converts the alternating current signal to a direct current signal as a DC voltage. The internal dimming signal I_DIM is the direct current signal as the DC voltage. The internal dimming signal I_DIM may be about zero (0) volt (V) to about 3.3 V. The input part 253a selectively receives one of the alternating current signal received from the external dimming signal E_DIM and the direct current signal received from the internal dimming signal I_DIM.

The diode part 253b includes a first diode D8 which is connected to the first input terminal IT1 and a second diode D9 which is connected to the second input terminal IT2. The external or internal dimming signal received from the input part 253a is applied to the voltage dividing part 253c through the diode part 253b.

The voltage dividing part 253c includes a plurality of resistors R7 and R8 which are connected to each other in series. The voltage dividing part 253c divides a voltage of the external or internal dimming signal and provides the oscillating transistor 253d with a divided voltage.

In an exemplary embodiment, the oscillating transistor 253d is a PNP transistor. The oscillating transistor 253d includes a control electrode which is connected to the voltage dividing part 253c, an input electrode which is connected to the frequency oscillating part 252 and an output electrode which is connected to the resistor part 253e. The oscillating transistor 253d turns on when the divided voltage is less than a threshold voltage of the oscillating transistor 253d. When the oscillating transistor 253d is turned on, the resistor part 253e and the first resistor R3 of the frequency oscillating part 252, which affects the driving frequency, are connected in parallel.

In such an embodiment, when the divided voltage is greater than the threshold voltage of the oscillating transistor 253d, the oscillating transistor 253d turns off. When the oscillating transistor 253d is turned off, the frequency modulating part 253 is electrically blocked from the frequency oscillating part 252 such that the frequency oscillating part 252 generates the chopping wave of the first driving frequency which is preset.

The resistor part 253e includes a second resistor R6 which is connected in parallel to the first resistor R3 of the frequency oscillating part 252. When the oscillating transistor 253d is turned on, the second resistor R6 is connected in parallel to the first resistor R3 such that the resistance $R_{RT}$ of Equation 1 is decreased. The driving frequency $f_{op}$, which is substantially inversely proportional to the resistance $R_{RT}$, is increased such that the frequency oscillating part 252 generates the chopping wave of the second driving frequency higher than the first driving frequency.

In such an embodiment, when the level of the external or internal dimming signal received from the input part 253a is greater than a preset value, the oscillating transistor 253d turns off such that the frequency oscillating part 252 generates the chopping wave of the first driving frequency of a low frequency. When the level of the external or internal dimming signal received from the input part 253a is less than the preset value, the oscillating transistor 253d turns on such that the frequency oscillating part 252 generates the chopping wave of the second driving frequency of a high frequency. The preset value may be set to have a duty ratio, which is the level of the external or internal dimming signal, of about 1% to about 2%.

According to an exemplary embodiment, as shown in FIG. 2, the frequency modulating part 253 may be designed by an external application circuit or be built in the frequency oscillating part 252, but not being limited thereto.

The current feedback part 254 may include a first OP amplifier 254a and a second OP amplifier 254b. The current feedback part 254 determines a duty ratio of the boosting switching signal based on the output current of the LED string LS.

In one exemplary embodiment, for example, the first OP amplifier 254a compares a detection voltage detected from a second end portion of the LED string LS, which is connected to a ground via a resistor R1, with a reference signal Vref and selectively outputs one of a first comparison signal and a second comparison signal. The first OP amplifier 254a outputs the first comparison signal, when the detection voltage is greater than the reference signal Vref. The first OP amplifier 254a outputs the second comparison signal, when the detection voltage is less than the reference signal Vref.

The second OP amplifier 254b outputs the boosting switching signal using the first or second comparison signal received from the first OP amplifier 254a and the chopping wave received from the frequency oscillating part 252. When the first comparison signal is received, the second OP amplifier 254b outputs the boosting switching signal which has the decreased duty ratio. When the second comparison signal is received, the second OP amplifier 254b outputs the boosting switching signal which has the increased duty ratio. Therefore, the current feedback part 254 may substantially uniformly maintain the output current of the LED string LS.

In an alternative exemplary embodiment, the frequency modulating part 253 may be disposed in the frequency oscillating part 252 as a single chip.

Figure 3:
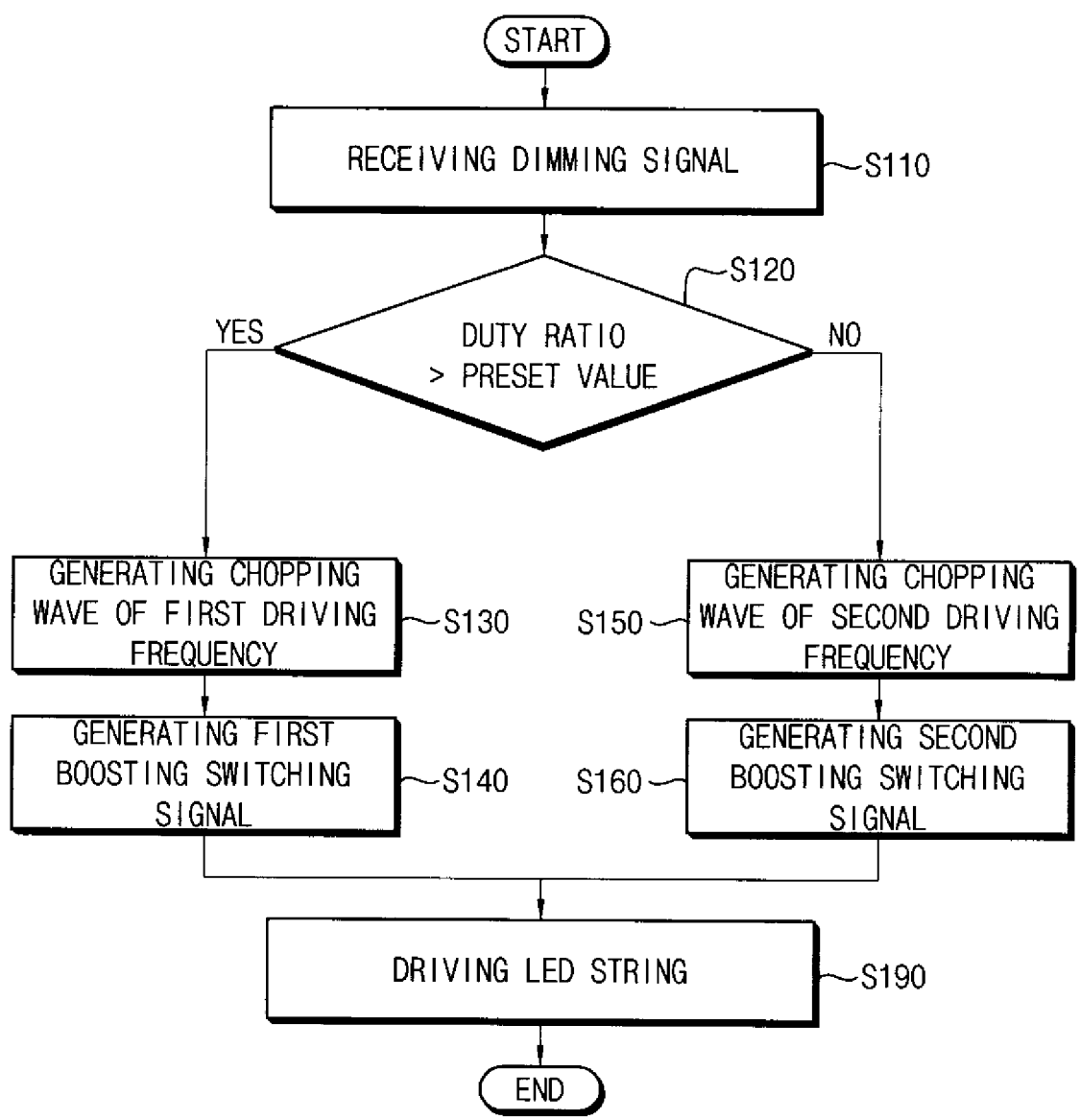
FIG. 3 is a flowchart diagram illustrating an exemplary embodiment of a method of driving the driving signal generating part shown in FIG. 2.

FIG. 3 is a flowchart diagram illustrating an exemplary embodiment of a method of driving the driving signal generating part shown in FIG. 2.

Referring to FIGS. 1, 2 and 3, hereinafter, the input signal of the driving signal generating part 250 may be referred to as the external dimming signal, which is a pulse signal.

The first input terminal IT1 receives the external dimming signal E_DIM (S110).

The frequency modulating part 253 compares the duty ratio of the external dimming signal E_DIM with the preset value (S120).

In one exemplary embodiment, for example, the external dimming signal E_DIM, which is the pulse signal, is converted into a first voltage through the digital-to-analog convertor DAC. The first voltage is divided into a second voltage less than the first voltage through the voltage dividing part 253c and applied to the oscillating transistor 253d. The threshold voltage of the oscillating transistor 253d may be preset corresponding to the duty ratio of about 1% with respect to the duty ratio of the dimming signal having a range of about zero (0) % to about 100%. According to the operation of the oscillating transistor 253d, which is the PNP transistor 253d, the frequency modulating part 253 may determine whether the duty ratio of the external dimming signal E_DIM is greater than or less than about 1%.

When the duty ratio of the external dimming signal E_DIM is greater than about 1%, which is the preset value, the oscillating transistor 253d turns off. When the oscillating transistor 253d is turned off, the frequency modulating part 253 is electrically blocked from the frequency oscillating part 252.

Therefore, the frequency oscillating part 252 generates the chopping wave of the first driving frequency, which is preset (S130).

The chopping wave of the first driving frequency is applied to the current feedback part 254. The second OP amplifier 254b of the current feedback part 254 outputs the first boosting switching signal using the comparison signal received from the first OP amplifier 254a and the chopping wave of the first driving frequency (S140). The first boosting switching signal may have the first driving frequency.

The integrated circuit 251e of the DC/DC converting part 251 controls a driving of the main transistor 251b based on the first boosting switching signal. In response to the first boosting switching signal of the first driving frequency, the main transistor 251b provides the LED string LS with the driving voltage Vout. Therefore, the LED string LS emits light (S190).

In such an embodiment, when the duty ratio of the external dimming signal E_DIM is less than about 1%, which is the preset value, the oscillating transistor 253d turns on. When the oscillating transistor 253d is turned on, the first resistor R3 of the frequency oscillating part 252 is connected in parallel with the second resistor R6 of the frequency modulating part 253. The second resistor R6 is connected in parallel to the first resistor R3 such that the resistance $R_{RT}$ of Equation 1, which controls the driving frequency of the frequency oscillating part 252, is decreased. Therefore, the frequency oscillating part 252 generates the chopping wave of the second driving frequency higher than the first driving frequency (S150).

The chopping wave of the second driving frequency is applied to the current feedback part 254. The second OP amplifier 254b of the current feedback part 254 outputs the second boosting switching signal using the comparison signal received from the first OP amplifier 254a and the chopping wave of the second driving frequency (S160). The second boosting switching signal may have the second driving frequency.

The integrated circuit 251e of the DC/DC converting part 251 controls the driving of the main transistor 251b based on the second boosting switching signal. In response to the second boosting switching signal of the second driving frequency, the main transistor 251b provides the LED string LS with the driving voltage Vout. Therefore, the LED string LS emits light (S190).

The number of times for applying the driving voltage Vout to a first end portion of the LED string LS are increased when the driving frequency of the first boosting switching signal is the high frequency than the low frequency. When the dimming signal has the duty ratio less than about 1%, the number of times for applying the driving voltage Vout to the first end portion of the LED string LS may be increased such that the current which flows through the LED string LS may be increased. Accordingly, a high level of the output current flowing through the LED string LS is effectively prevented from being decreased.

According to an exemplary embodiment, when the duty ratio of the dimming signal is a low duty ratio, which is less than about 1%, as well as a high duty ratio, the luminance of the light-source module may be effectively controlled, and a contrast ratio is thereby substantially improved.

Figure 4A:
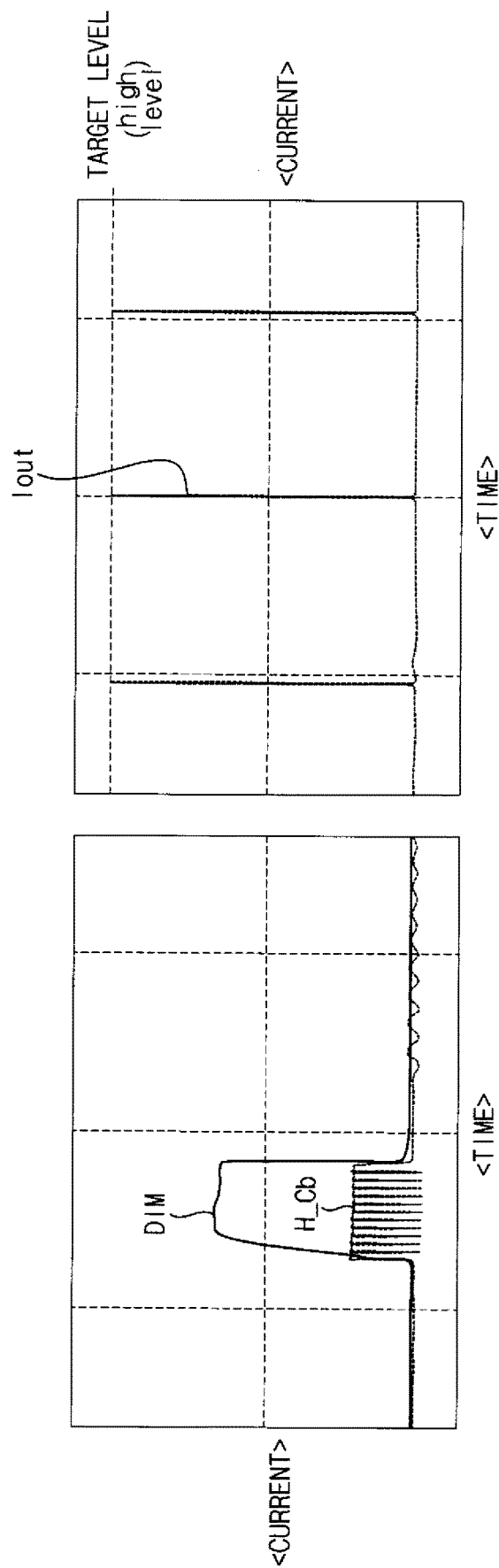
FIGS. 4A and 4B are waveform diagrams illustrating an output current of LED string which receives a dimming signal having a low duty ratio.
Figure 4B:
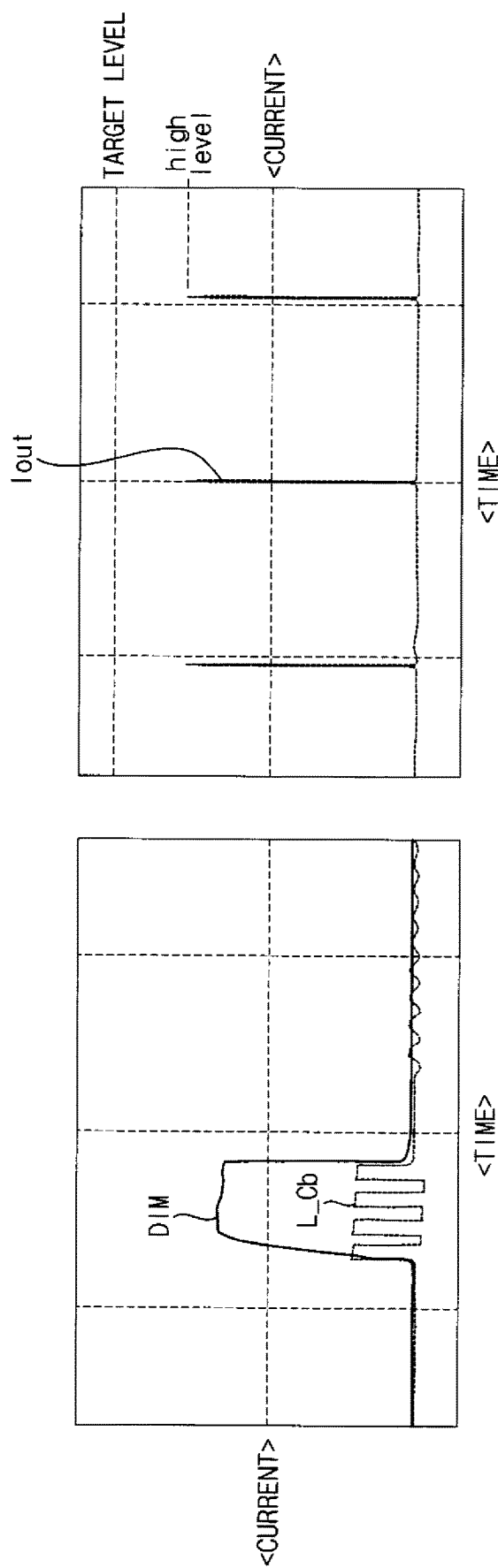

FIGS. 4A and 4B are waveform diagrams illustrating an output current of an exemplary embodiment of an LED string, which receives a dimming signal having a low duty ratio.

FIG. 4A is a graph diagram illustrating the boosting switching signal and the output current of an exemplary embodiment of the LED string and FIG. 4B is a graph diagram illustrating the boosting switching signal and the output current of an comparative embodiment of the LED string.

Referring to FIGS. 2 and 4A, according to an exemplary embodiment, when the duty ratio of the dimming signal DIM is less than about 1%, the frequency oscillating part 252 outputs the chopping wave of the high frequency according to a control of the frequency modulating part 253 and the current feedback part 254 outputs the boosting switching signal H_Cb of the high frequency based on the chopping wave of the high frequency. Thus, the output current Iout of the LED string is maintained to a target level (high level).

Referring to FIGS. 2 and 4B, the comparative embodiment is substantially the same as the exemplary embodiment of FIG. 4A, except that the frequency modulating part 253 is omitted therefrom. According to the comparative embodiment, when the duty ratio of the dimming signal DIM is less than about 1%, the frequency oscillating part 252 outputs the chopping wave of the low frequency and the current feedback part 254 outputs the boosting switching signal L_Cb of the low frequency based on the chopping wave of the low frequency. Thus, the output current Iout of the LED string is decreased.

According to an exemplary embodiment, when the dimming signal having the duty ratio which is less than about 1% is applied to the light-source module, the output current of the light-source module is effectively prevented from being decreased. Thus, luminance of the light-source module is effectively controlled such that a contrast ratio is substantially improved.

Hereinafter, alternative exemplary embodiments of the driving signal generating part will now be described in detail. The same reference numerals are used to refer to the same or like parts as those described in the exemplary embodiment in FIGS. 2 to 4B, and any repetitive detailed description thereof will be omitted or simplified.

Figure 5:
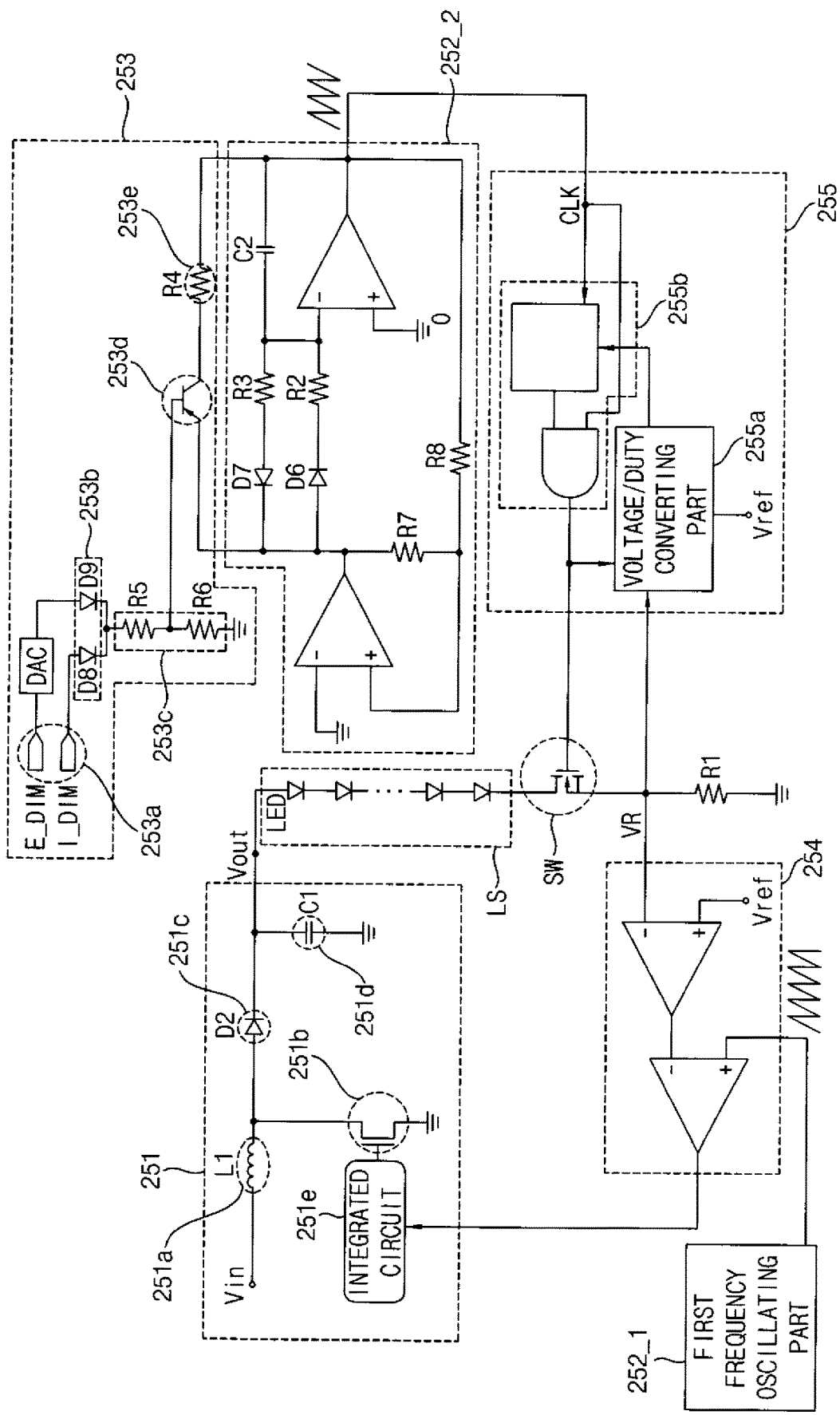
FIG. 5 is a circuit diagram illustrating an alternative exemplary embodiment of a driving signal generating part according to the invention.

FIG. 5 is a circuit diagram illustrating an alternative exemplary embodiment of a driving signal generating part according to the invention.

Referring to FIGS. 1 and 5, the display apparatus may include a driving signal generating part 250 and a light-source module 200. The light-emitting block included in the light-source module 200 may be individually driven and may include a LED string LS.

The driving signal generating part 250 may include a DC/DC converting part 251, a first frequency oscillating part 252_1, a frequency modulating part 253, a second frequency oscillating part 252_2, a current feedback part 254 and a constant current control part 255. The LED string LS includes a plurality of light-emitting diodes LED, which is connected to each other in series. A first end portion of the LED string is connected to an output terminal of the DC/DC converting part 251 and a second end portion of the LED string is connected to a ground through a control switching element SW and a resistor R1.

The DC/DC converting part 251 includes a boosting part 251a, a main transistor 251b, a rectification part 251c, a charging part 251d and an integrated circuit 251e. The boosting part 251a includes an inductor L1. The boosting part 251a boosts up an input voltage Vin to generate a driving voltage Vout based on an operation of the main transistor 251b. The main transistor 251b includes a control electrode connected to the integrated circuit 251e, an input electrode connected to the boosting part 251a and an output electrode connected to a ground. The main transistor 251b turns on or turns off in response to a boosting switching signal received from the integrated circuit 251e. The rectification part 251c may include a diode D1, and is connected to the boosting part 251a and the charging part 251d. The charging part 251d may include a capacitor C1 and is connected to the rectification part 251c and a first end portion of the LED string LS to charge the driving voltage Vout.

The integrated circuit 251e performs a boosting operation and a dimming operation to drive the LED string LS. In one exemplary embodiment, for example, the integrated circuit 251e controls the main transistor 251b based on the boosting switching signal received from the current feedback part 254.

The frequency oscillating part 252_1 generates an oscillating wave that is a boosting chopping wave. The boosting chopping wave is applied to the current feedback part 254.

The current feedback part 254 includes a first OP amplifier 254a and a second OP amplifier 254b. The current feedback part 254 controls the duty ratio of the boosting switching signal based on an output current of the LED string LS.

In one exemplary embodiment, for example, the first OP amplifier 254a compares a detection voltage VR detected from the second end portion of the LED string LS with a reference signal Vref and selectively outputs one of a first comparison signal and a second comparison signal. The first OP amplifier 254a outputs the first comparison signal, when the detection voltage VR is greater than the reference signal Vref. The first OP amplifier 254a outputs the second comparison signal, when the detection voltage VR is less than the reference signal Vref.

The second OP amplifier 254b outputs the boosting switching signal using the first or second comparison signal received from the first OP amplifier 254a and the boosting chopping wave received from the frequency oscillating part 252_1. When the first comparison signal is received, the second OP amplifier 254b outputs the boosting switching signal which has the decreased duty ratio. When the second comparison signal is received, the second OP amplifier 254b outputs the boosting switching signal which has the increased duty ratio. Therefore, the current feedback part 254 substantially uniformly maintains the output current of the LED string LS.

The second frequency oscillating part 252_2 generates an oscillating wave that is a chopping wave for controlling a PWM signal. The second frequency oscillating part 252_2 may include a plurality of OP amplifiers, a plurality of resistors R2, R3, R7 and R8, a plurality of diodes D6 and D7 and a capacitor C2, but not being limited thereto. In one exemplary embodiment, for example, the second frequency oscillating part 252_2 generates the chopping wave having the driving frequency $f_{op}$ according to Equation 1.

The resistance $R_{RT}$ of Equation 1 may corresponds to a resistance of the first resistor R3 included in the second frequency oscillating part 252_2. In such an embodiment, the driving frequency of the chopping wave is determined based on the resistance of the first resistor R3.

The frequency modulating part 253 may include an input part 253a, a diode part 253b, a voltage dividing part 253c, an oscillating transistor 253d and a resistor part 253e. The frequency modulating part 253 modulates the driving frequency of the chopping wave based on the level of the dimming signal.

The input part 253a includes a first input terminal IT1 which receives an external dimming signal E_DIM and a second input terminal IT2 which receives an internal dimming signal I_DIM. The frequency modulating part 253 further include a digital-to-analog convertor DAC which is connected to the first input terminal IT1. The external dimming signal E_DIM is an alternating current signal including a pulse. The digital-to-analog convertor DAC converts the alternating current signal to a direct current signal as a DC voltage. The internal dimming signal I_DIM is the direct current signal as the DC voltage. The internal dimming signal I_DIM may be about zero (0) V to about 3.3 V. The input part 253a selectively receive one of the alternating current signal received from the external dimming signal E_DIM and the direct current signal received from the internal dimming signal I_DIM.

The diode part 253b includes a first diode D8 which is connected to the first input terminal IT1 and a second diode D9 which is connected to the second input terminal IT2. The external or internal dimming signal received from the input part 253a is applied to the voltage dividing part 253c through the diode part 253b.

The voltage dividing part 253c includes a plurality of resistors R5 and R6 which are connected to each other in series. The voltage dividing part 253c divides a voltage of the external or internal dimming signal and provides the oscillating transistor 253d with a divided voltage.

The oscillating transistor 253d is a PNP transistor. The oscillating transistor 253d includes a control electrode which is connected to the voltage dividing part 253c, an input electrode which is connected to the second frequency oscillating part 252_2 and an output electrode which is connected to the resistor part 253e. The oscillating transistor 253d turns on when the divided voltage is less than a threshold voltage of the oscillating transistor 253d. When the oscillating transistor 253d is turned on, the resistor part 253e is connected in parallel to a first resistor R3 that affects the driving frequency.

In such an embodiment, the oscillating transistor 253*d* turns off, when the divided voltage is greater than the threshold voltage of the oscillating transistor 253*d*. When the oscillating transistor 253*d* is turned off, the frequency modulating part 253 is electrically blocked from the frequency oscillating part 252 such that the second frequency oscillating part 252_2 generates the chopping wave of the first driving frequency, which is preset.

The resistor part 253*e* includes a second resistor R4 which is connected in parallel to the first resistor R3 of the second frequency oscillating part 252_2. When the oscillating transistor 253*d* is turned on, the second resistor R4 is connected in parallel to the first resistor R3 such that the resistance $R_{RT}$ of Equation 1 is decreased. The driving frequency $f_{op}$, which is substantially inversely proportional to the resistance $R_{RT}$, is increased such that the second frequency oscillating part 252_2 generates the chopping wave of the second driving frequency higher than the first driving frequency.

In such an embodiment, when the level of the external or internal dimming signal received from the input part 253*a* is greater than a preset value, the oscillating transistor 253*d* turns off such that the second frequency oscillating part 252_2 generates the chopping wave of the first driving frequency of a low frequency. When the level of the external or internal dimming signal received from the input part 253*a* is less than the preset value, the oscillating transistor 253*d* turns on such that the second frequency oscillating part 252_2 generates the chopping wave of the second driving frequency of a high frequency. In an exemplary embodiment, the preset value may be preset a duty ratio, which is the level of the external or internal dimming signal, of about 1% to about 2%.

According to an exemplary embodiment, the frequency modulating part 253 may be designed by an external application circuit or be built in the second frequency oscillating part 252_2, but not being limited thereto.

The constant current control part 255 generates a PWM control signal using the chopping wave of the first or second driving frequency determined from the frequency modulating part 253 based on the duty ratio of the dimming signal. The PWM control signal controls a current which flows through the LED string into a constant current. The PWM control signal includes a plurality of current control pulses which is repeated with a period corresponding to the first or second driving frequency. The constant current control part 255 may include a voltage/duty converting part 255*a* and a pulse generating part 255*b*.

The voltage/duty converting part 255*a* determines a duty ratio of the current control pulse based on the detection voltage VR detected from the second end portion of the LED string LS. In one exemplary embodiment, for example, when the detection voltage VR has a high level, a low current flows through the LED string LS according to a control of the current feedback part 254 such that the voltage/duty converting part 255*a* increases the duty ratio of the current control pulse. When the detection voltage VR has a low level, a high current flows through the LED string LS according to the control of the current feedback part 254 such that the voltage/duty converting part 255*a* decreases the duty ratio of the current control pulse.

The pulse generating part 255*b* generates the PWM control signal using the chopping wave of the first or second driving frequency received from the frequency modulating part 253 and the duty ratio received from the voltage/duty converting part 255*a*. The PWM control signal includes the current control pulse which is repeated with a period corresponding to the driving frequency. The control switching element SW repetitively turns on and turns off in response to the current control pulse in the PWM control signal during a high period of the dimming signal.

Figure 7A:
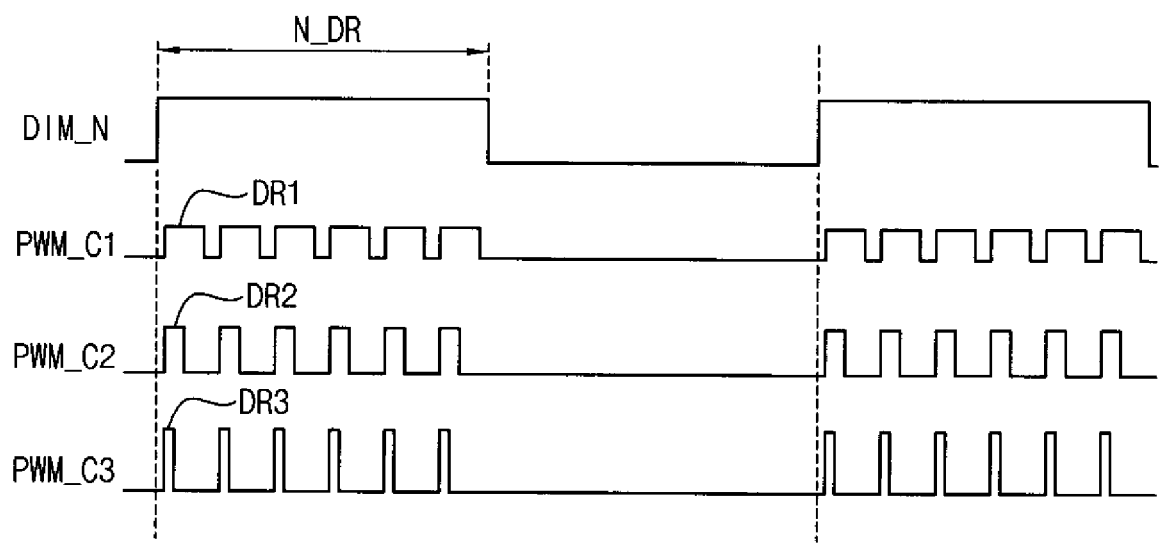
FIGS. 7A and 7B are signal timing diagrams illustrating a PWM control signal of the LED string according to the duty ratio of the dimming signal in the driving signal generating part shown in FIG. 5.
Figure 7B:
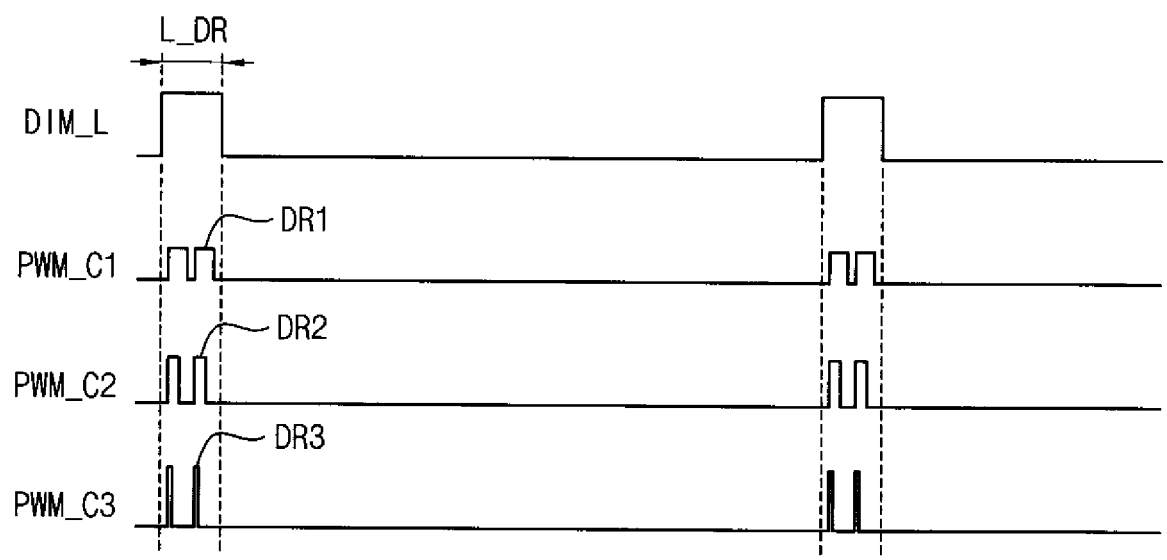

FIG. 6 is a flowchart diagram illustrating an exemplary embodiment of a method of driving the driving signal generating part shown in FIG. 5. FIGS. 7A and 7B are waveform diagrams illustrating a PWM control signal of the LED string according to the duty ratio of the dimming signal in the driving signal generating part shown in FIG. 5.

Referring to FIGS. 1, 5 and 6, hereinafter, the input signal of the driving signal generating part 250 may be referred to as the external dimming signal which is a pulse signal.

The first input terminal IT1 receives the external dimming signal E_DIM (S210).

The frequency modulating part 253 compares the duty ratio of the external dimming signal E_DIM with the preset value (S220).

In one exemplary embodiment, for example, the external dimming signal E_DIM, which is the pulse signal, is converted into a first voltage through the digital-to-analog convertor DAC. The first voltage is divided into a second voltage less than the first voltage through the voltage dividing part 253*c* and applied to the oscillating transistor 253*d*. The threshold voltage of the oscillating transistor 253*d* may be preset corresponding to the duty ratio of about 1% with respect to the duty ratio of the dimming signal having a range of about zero (0) % to about 100%. According to the operation of the oscillating transistor 253*d*, which is the PNP transistor 253*d*, the frequency modulating part 253 may determine whether the duty ratio of the external dimming signal E_DIM is greater than or less than about 1%.

When the duty ratio of the external dimming signal E_DIM is greater than about 1%, which is the preset value, the oscillating transistor 253*d* turns off. When the oscillating transistor 253*d* is turned off, the frequency modulating part 253 is electrically blocked from the second frequency oscillating part 252_2.

Therefore, the second frequency oscillating part 252_2 generates the chopping wave of the first driving frequency, which is preset (S230).

The chopping wave of the first driving frequency is applied to the constant current control part 255. The constant current control part 255 generates the first PWM control signal of the first driving frequency based on the detection voltage VR detected from the second of the LED string LS (S240). The first PWM control signal includes the current control pulse having the duty ratio corresponding to the level of the detection voltage VR, and the current control pulse is repeated with the period corresponding to the first driving frequency during the high period of the dimming signal.

The control switching element SW, which is connected to the second end portion of the LED string LS, repetitively turns on and turns off in response to the first PWM control signal of the first driving frequency during the high period of the dimming signal. Thus, the LED string LS emits light (S290).

In one exemplary embodiment, for example, referring to FIG. 7A, the light-source module 200 may include a first LED string, a second LED string and a third LED string, which have different detection voltages VR, respectively. In such an embodiment, a first detection voltage of the first LED string may have a highest level, a third detection voltage of third LED string may have a lowest level and a second detection voltage of the second LED string may have a level between the first detection voltage and the third detection voltage.

In such an embodiment, the light-source module 200 may receive the dimming signal DIM_N having the duty ratio N_DR greater than the preset value. According to the dimming signal DIM_N having the duty ratio N_DR greater than the preset value, the oscillating transistor 253*d* turns off. Thus, the second frequency oscillating part 252_2 is electrically blocked from the frequency modulating part 253. The second frequency oscillating part 252_2 generates the chopping wave of the first driving frequency, which is preset.

An exemplary embodiment of a method of driving the first LED string will now be described. The chopping wave of the first driving frequency is applied to the constant current control part 255. The voltage/duty converting part 255*a* determines a first duty ratio DR1 of the current control pulse based on the first detection voltage. When the first detection voltage has the highest level, the first duty ratio DR1 is preset to be the highest as the current feedback part 254 decreases the duty ratio of the boosting switching signal when the detection voltage of the LED string increases. Therefore, the current flowing through the LED string has a low level and the duty ratio of the PWM control signal increases such that an average current flowing through the LED string is substantially constant. In such an embodiment, the current feedback part 254 increases the duty ratio of the boosting switching signal when the detection voltage of the LED string decreases. Therefore, the current flowing through the LED string has a high level and the duty ratio of the PWM control signal decreases.

The pulse generating part 255*b* generates a first PWM control signal PWM_C1 using the chopping wave of the first duty ratio DR1. The first PWM control signal PWM_C1 is applied to the control switching element SW which is connected to the first LED string. The control switching element SW connected to the first LED string repetitively turns on and turns off in response to the first PWM control signal PWM_C1 during the high period N_DR of the dimming signal DIM_N.

An exemplary embodiment of a method of driving the second LED string will now be described. The chopping wave of the first driving frequency is applied to the constant current control part 255. The voltage/duty converting part 255*a* determines a second duty ratio DR2 of the current control pulse based on the second detection voltage. When the second detection voltage is less than the first detection voltage, the second duty ratio DR2 is preset to be less than the first duty ratio DR1.

The pulse generating part 255*b* generates a second PWM control signal PWM_C2 using the second duty ratio DR2 and the chopping wave of the first driving frequency. The second PWM control signal PWM_C2 has a driving frequency which is the same as the driving frequency of the first PWM control signal PWM_C1 and has a duty ratio which is different from the duty ratio of the first PWM control signal PWM_C1. The second PWM control signal PWM_C2 is applied to the control switching element SW which is connected to the second LED string. The control switching element SW connected to the second LED string repetitively turns on and turns off in response to the second PWM control signal PWM_C2 during the high period N_DR of the dimming signal DIM_N.

An exemplary embodiment of a method of driving the third LED string will now be described. The chopping wave of the first driving frequency is applied to the constant current control part 255. The voltage/duty converting part 255*a* determines a third duty ratio DR3 based on the third detection voltage. When the third detection voltage has the lowest level, the third duty ratio DR3 is preset to be less than the second duty ratio DR2.

The pulse generating part 255*b* generates a third PWM control signal PWM_C3 using the third duty ratio DR3 and the chopping wave of the first driving frequency. The third PWM control signal PWM_C3 has a driving frequency which is the same as the driving frequencies of the first and second PWM control signals PWM_C1 and PWM_C2, and has a duty ratio which is different from the duty ratios of the first and second PWM control signals PWM_C1 and PWM_C2. The third PWM control signal PWM_C3 is applied to the control switching element SW which is connected to the third LED string. The control switching element SW connected to the third LED string repetitively turns on and turns off in response to the third PWM control signal PWM_C3 during the high period N_DR of the dimming signal DIM_N.

As described above, in such an embodiment, the average current flowing through each of the first, second and third LED strings, is substantially the same as each other.

In an exemplary embodiment, when the duty ratio of the external dimming signal E_DIM is less than about 1%, which is the preset value, the oscillating transistor 253*d* turns on. When the oscillating transistor 253*d* is turned on, the first resistor R3 in the second frequency oscillating part 252_2 is connected in parallel to the second resistor R4 of the frequency modulating part 253. In such an embodiment, the second resistor R4 is connected in parallel to the first resistor R3 such that the resistance $R_{RT}$ of Equation 1, which determines the driving frequency of the second frequency oscillating part 252_2, is decreased. Therefore, the second frequency oscillating part 252_2 generates the chopping wave of the second driving frequency higher than the first driving frequency (S250).

The chopping wave of the second driving frequency is applied to the constant current control part 255. The constant current control part 255 generates a second PWM control signal of the second driving frequency based on the detection voltage VR detected from the second end portion of the LED string (S260). The second PWM control signal includes the current control pulse having the duty ratio corresponding to the level of the detection voltage VR, and the current control pulse is repeated with the period corresponding to the first driving frequency during the high period of the dimming signal.

The control switching element SW, which is connected to the second end portion of the LED string LS, repetitively turns on and turns off in response to the second PWM control signal of the second driving frequency during the high period of the dimming signal. Thus, the LED string LS emits light (S290).

In one exemplary embodiment, for example, referring to FIG. 7B, the light-source module 200 may include a first LED string, a second LED string and a third LED string, which have different detection voltages VR, respectively. A first detection voltage of the first LED string may have a highest level, a third detection voltage of third LED string may have a lowest level and a second detection voltage of the second LED string may have a level between the first detection voltage and the third detection voltage.

The light-source module 200 receives the dimming signal DIM_L having the duty ratio L_DR less than the preset value. According to the dimming signal DIM_L having the duty ratio L_DR less than the preset value, the oscillating transistor 253*d* turns on. Thus, the second frequency oscillating part 252_2 is electrically connected to the frequency modulating part 253. The second frequency oscillating part 252_2 generates the chopping wave of the second driving frequency which is higher than the first driving frequency.

An exemplary embodiment of a method of driving the first LED string will now be described. The chopping wave of the first driving frequency is applied to the constant current control part 255. The voltage/duty converting part 255a determines a first duty ratio DR1 of the current control pulse based on the first detection voltage. When the first detection voltage has the highest level, the first duty ratio DR1 is preset to be the highest. As shown in FIG. 7B, the first PWM control signal PWM_C1 may include at least two current control pulses having the first duty ratio DR1 in the high period L_DR of the dimming signal DIM_L which has the duty ratio less than the preset value.

The pulse generating part 255b generates a first PWM control signal PWM_C1 using the chopping wave of the first duty ratio DR1. The first PWM control signal PWM_C1 is applied to the control switching element SW which is connected to the first LED string. The control switching element SW connected to the first LED string repetitively turns on and turns off in response to the first PWM control signal PWM_C1 during the high period L_DR of the dimming signal DIM_L.

An exemplary embodiment of a method of driving the second LED string will now be described. The chopping wave of the first driving frequency is applied to the constant current control part 255. The voltage/duty converting part 255a determines a second duty ratio DR2 of the current control pulse based on the second detection voltage. When the second detection voltage is less than the first detection voltage, the second duty ratio DR2 is preset to be less than the first duty ratio DR1. As shown in FIG. 7B, the second PWM control signal PWM_C2 may include at least two current control pulses having the second duty ratio DR2 in the high period L_DR of the dimming signal DIM_L.

The pulse generating part 255b generates a second PWM control signal PWM_C2 using the second duty ratio DR2 and the chopping wave of the first driving frequency. The second PWM control signal PWM_C2 has a driving frequency which is the same as that of the first PWM control signal PWM_C1 and has a duty ratio which is different from that of the first PWM control signal PWM_C1. The second PWM control signal PWM_C2 is applied to the control switching element SW which is connected to the second LED string. The control switching element SW connected to the second LED string repetitively turns on and turns off in response to the second PWM control signal PWM_C2 during the high period L_DR of the dimming signal DIM_L.

An exemplary embodiment of a method of driving the third LED string will now be described. The chopping wave of the first driving frequency is applied to the constant current control part 255. The voltage/duty converting part 255a determines a third duty ratio DR3 based on the third detection voltage. The third detection voltage has the lowest level so that the third duty ratio DR3 is preset to be less than the second duty ratio DR2. As shown in FIG. 7B, third PWM control signal PWM_C3 may include at least two current control pulses having the third duty ratio DR3 in the high period L_DR of the dimming signal DIM_L.

The pulse generating part 255b generates a third PWM control signal PWM_C3 using the third duty ratio DR3 and the chopping wave of the first driving frequency. The third PWM control signal PWM_C3 has a driving frequency which is the same as the driving frequencies of the first and second PWM control signals PWM_C1 and PWM_C2, and has a duty ratio which is different from duty ratios of the first and second PWM control signals PWM_C1 and PWM_C2. The third PWM control signal PWM_C3 is applied to the control switching element SW which is connected to the third LED string. The control switching element SW connected to the third LED string repetitively turns on and turns off in response to the third PWM control signal PWM_C3 during the high period L_DR of the dimming signal DIM_L.

As described above, in such an embodiment, when the dimming signal having the low duty ratio is received, the driving frequency of the PWM control signal increases such that the PWM control signal includes at least two current control pulse in the high period of the dimming signal. Therefore, the average current flowing through each of the first, second and third LED strings, is substantially the same as each other.

According to an exemplary embodiment, when the duty ratio of the dimming signal is a low duty ratio, which is less than about 1%, the average current is effectively controlled, and a contrast ratio is thereby substantially improved.

Figure 8A:
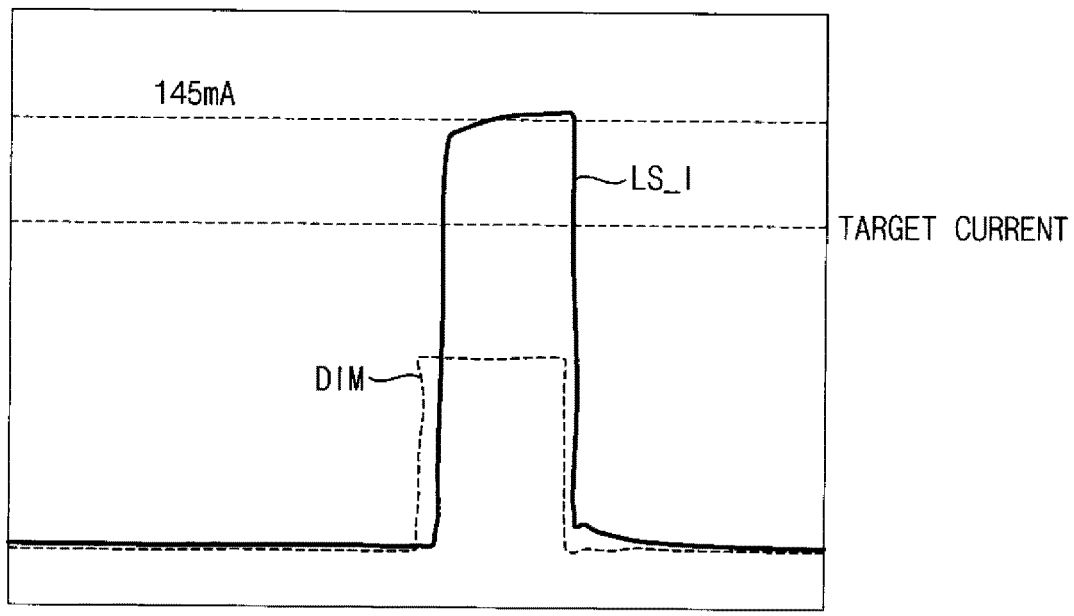
FIGS. 8A and 8B are waveform diagrams illustrating an output current of LED string which receives a dimming signal having a low duty ratio.
Figure 8B:
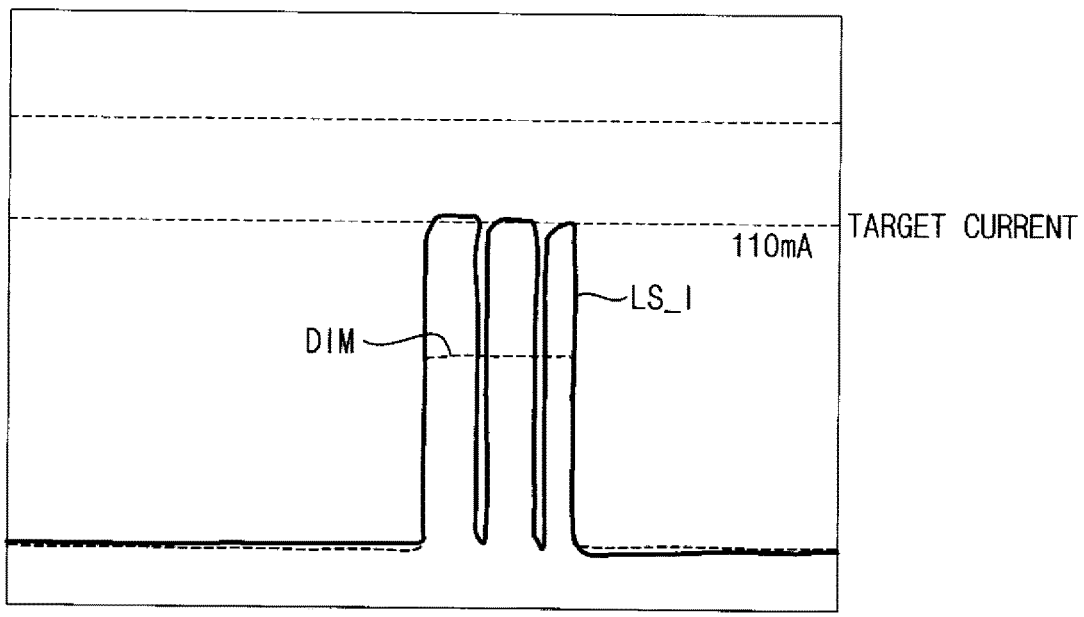

FIGS. 8A and 8B are waveform diagrams illustrating an output current of LED string which receives a dimming signal having a low duty ratio.

FIG. 8A is a graph diagram illustrating the dimming signal and the output current of an exemplary embodiment of the LED string, and FIG. 8B is a graph diagram illustrating the dimming signal and the output current of a comparative embodiment of the LED string.

Referring to FIG. 8A, according to the comparative embodiment, the driving frequency of the PWM control signal may be preset as about 12 kilohertz (kHz) regardless of the duty ratio of the dimming signal DIM. Thus, the PWM control signal has only one current control pulse during the high period of the dimming signal which has the duty ratio less than about 1%. In the comparative embodiment, the current flowing through the LED string LS_I may be about 145 milliampere (mA). Therefore, the current flowing through the LED string LS_I becomes greater than the target current of about 110 mA.

According to the comparative embodiment, when the dimming signal has the low duty ratio, the average current of the LED string may be effectively controlled.

However, referring to FIG. 8B, according to the exemplary embodiment, the driving frequency of the PWM control signal was modulated to the high frequency based on the duty ratio of the dimming signal DIM. In such an embodiment, when the dimming signal had the low duty ratio, the driving frequency may be preset as about 30 kHz. Thus, the PWM control signal has more than two current control pulses during the high period of the dimming signal which has the duty ratio less than about 1%. In such an embodiment, the current flowing through the LED string LS_I may be about 110 mA. Therefore, the current flowing through the LED string LS_I may be controlled to be substantially the same as the target current of about 110 mA.

According to an exemplary embodiment, when the dimming signal has the low duty ratio, the average current of the LED string is effectively controlled.

In an exemplary embodiment, when the dimming signal has the duty ratio greater than a high preset value which is preset as a threshold value, the driving frequency of the PWM control signal may be decreased such that the switching element which drives the LED string is effectively prevented from being damaged.

Figure 9:
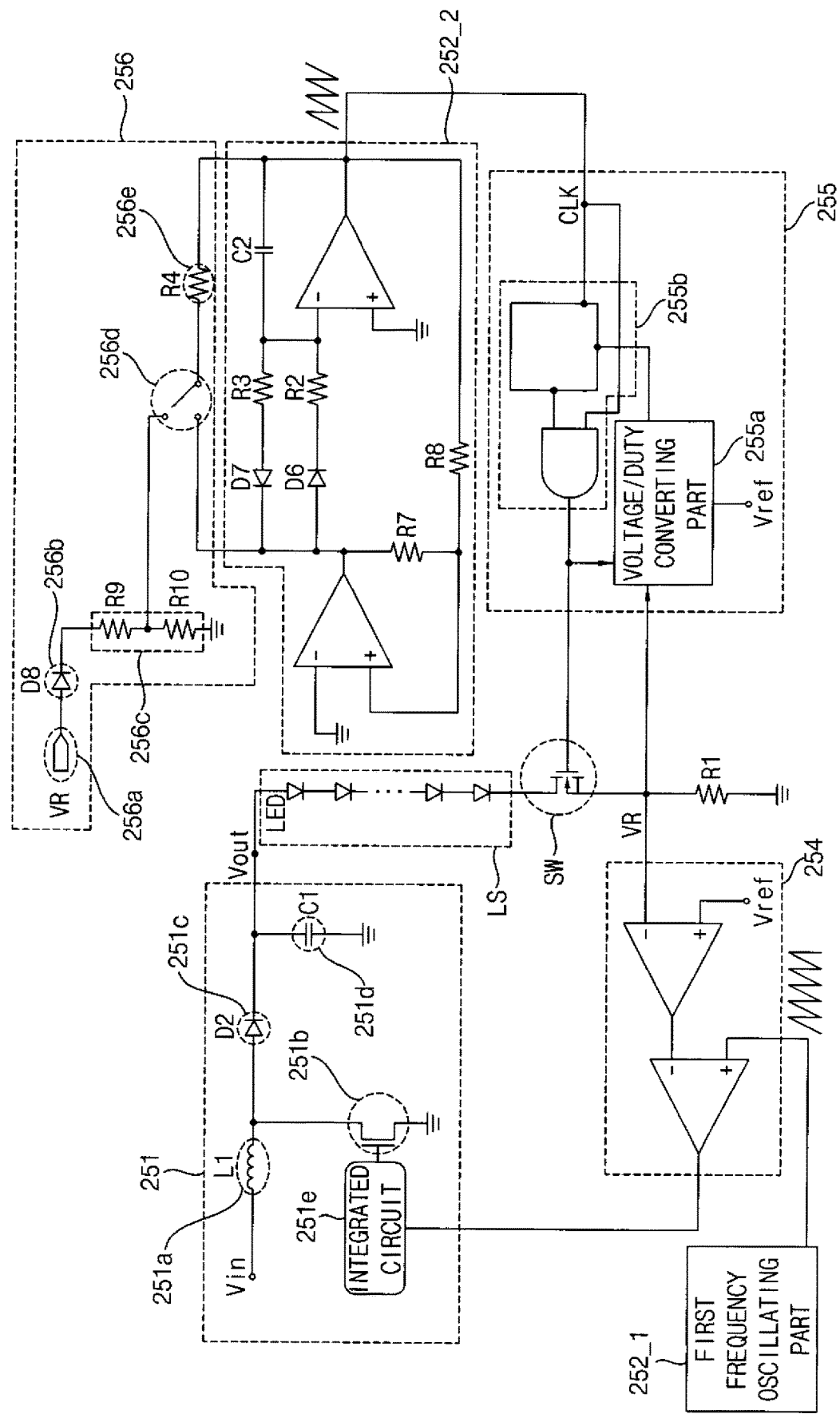
FIG. 9 is a circuit diagram illustrating another alternative exemplary embodiment of a driving signal generating part according to the invention.

FIG. 9 is a circuit diagram illustrating another alternative exemplary embodiment of a driving signal generating part according to the invention.

Referring to FIGS. 1 and 9, an exemplary embodiment of the driving signal generating part 250A includes a DC/DC converting part 251, a first frequency oscillating part 252_1, a frequency modulating part 256, a second frequency oscillating part 252_2, a current feedback part 254 and a constant current control part 255. The LED string LS includes a plurality of light-emitting diodes LED connected to each other in series. A first end portion of the LED string is connected to an output terminal of the DC/DC converting part 251 and a second end portion of the LED string is connected to a ground through a control switching element SW and a resistor R1.

The exemplary embodiment of the driving signal generating part 250A in FIG. 9 is substantially the same as the exemplary embodiment shown in FIG. 5, except for the frequency modulating part 256. The same or like elements shown in FIG. 9 have been labeled with the same reference characters as used above to describe the exemplary embodiments of the driving signal generating part shown in FIG. 5, and any repetitive detailed description thereof will hereinafter be omitted or simplified.

In an exemplary embodiment, the frequency modulating part 256 includes an input part 256a, a diode part 256b, a voltage dividing part 256c, an oscillating transistor 256d and a resistor part 256e, and modulates the driving frequency of the chopping wave based on the level of the dimming signal.

The input part 256a receives a detection voltage VR detected from the second end portion of the LED string. The average current flowing through the LED string LS may be predetermined based on the level of the detection voltage VR. In one exemplary embodiment, for example, when a target average current, which is preset, flows through the LED string LS, the detection voltage VR detected from the LED string LS preset as a preset value. When the average current flowing through the LED string LS is higher than the target average current, the detection voltage VR is higher than the preset value, and when the average current flowing through the LED string LS is lower than the target average current, the detection voltage VR is lower than the preset value.

The diode part 256b includes a diode D8 which is connected to the input part 256a. The detection voltage VR received from the input part 256a is applied to the voltage dividing part 256c through the diode part 253b.

The voltage dividing part 256c includes a plurality of resistors R9 and R10, which are connected to each other in series. The voltage dividing part 256c divides the detection voltage VR and provides the oscillating transistor 256d with a divided voltage.

The oscillating transistor 256d includes a control electrode which is connected to the voltage dividing part 256c, an input electrode which is connected to the second frequency oscillating part 252_2 and an output electrode which is connected to the resistor part 256e.

The oscillating transistor 256d turns on when the divided voltage is different from a threshold voltage of the oscillating transistor 256d. When the oscillating transistor 256d is turned on, the resistor part 256e is connected in parallel to a first resistor R3 affecting the driving frequency.

However, the oscillating transistor 256d turns off, when the divided voltage is substantially the same as the threshold voltage of the oscillating transistor 256d. When the oscillating transistor 256d is turned off, the frequency modulating part 256 is electrically blocked from the second frequency oscillating part 252_2 such that the second frequency oscillating part 252_2 generates the chopping wave of the first driving frequency, which is preset.

The resistor part 256e includes a second resistor R4 which is connected in parallel to the first resistor R3 of the second frequency oscillating part 252_2. When the oscillating transistor 256d is turned on, the second resistor R4 is connected in parallel to the first resistor R3 such that the resistance $R_{RT}$ of Equation 1 is decreased. The driving frequency $f_{op}$, which is substantially inversely proportional to the resistance $R_{RT}$, is increased such that the second frequency oscillating part 252_2 generates the chopping wave of the second driving frequency higher than the first driving frequency.

In such an embodiment, when the level of the detection voltage VR received from the input part 256a is substantially the same as the preset value, the oscillating transistor 256d turns off such that that the second frequency oscillating part 252_2 generates the chopping wave having the first driving frequency of the low frequency. When the level of the detection voltage VR received from the input part 256a is different from the preset value, the oscillating transistor 256d turns on such that the second frequency oscillating part 252_2 generates the chopping wave having the second driving frequency of the high frequency. The preset value may be preset as the level of the detection voltage VR corresponding to the target average current flowing through the LED string.

As described above, in such an embodiment, the PWM control signal is generated using the chopping wave received from the second frequency oscillating part 252_2 and the LED string LS is driven using the PWM control signal. Thus, any repetitive detailed description thereof will be omitted.

According to an exemplary embodiment, the frequency modulating part 256 controls the second frequency oscillating part 252_2 to adjust the driving frequency of the chopping based on the detection voltage VR detected from the LED string. Accordingly, when the detection voltage VR is different from the preset value, the driving frequency of the PWM control signal may be increased such that the average current of the LED string is effectively controlled.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A method of driving a light-source module, the method comprising:
   determining, by a light-source driving part, a duty ratio using a detection voltage detected from an end portion of a light-emitting diode ("LED") string of the light-source module, the light-source driving part comprising a main transistor and a control switching element connected to the end portion of the LED string;

generating a pulse width modulation ("PWM") control signal having a current control pulse to control the control switching element, wherein the LED string comprises a plurality of LEDs connected to each other in series; and controlling the control switching element in response to the PWM control signal, wherein the generating the PWM control signal comprises generating a chopping wave of a first driving frequency, the light-source module comprises a frequency oscillating part comprising a first resistor, and the chopping wave has a driving frequency using a following Equation:

$$f_{op} = \frac{K}{R_{RT}[k\Omega]},$$

where K is a constant, and $R_{RT}$ denotes a resistance in kiloohm of the first resistor, wherein the light-source driving part comprises:

an image analyzing part configured to analyze an image signal and to determine a target luminance value of the LED string;

a dimming level determining part configured to determine a dimming signal of the LED string using the target luminance value; and a driving signal generating part comprising the main transistor, configured to adjust a driving frequency of a boosting switching signal based on the dimming signal and configured to drive the main transistor in response to the boosting switching signal, wherein the driving signal generating part comprises:

the frequency oscillating part configured to generate the chopping wave;

a frequency modulating part configured to modulate the driving frequency of the chopping wave to the first driving frequency, or a second driving frequency higher than the first driving frequency, based on the dimming signal which controls luminance of the LED string; and a constant current control part configured to generate first or second PWM control signal including the current control pulse repeated with the first or second driving frequency in an enable period of the dimming signal based on the chopping wave of the first or second driving frequency, and wherein the frequency modulating part comprises:

an input part configured to receive the dimming signal;

a voltage dividing part configured to divide a voltage of the dimming signal;

a diode part connected to the input part and the voltage dividing part;

an oscillating transistor configured to operate in response to a divided voltage received from the voltage dividing part; and a resistor part comprising a second resistor connected in parallel to the first resistor of the frequency oscillating part, which determines the driving frequency of the chopping wave.

2. The method of claim 1, wherein the generating the PWM control signal comprises:

generating the chopping wave of the first driving frequency when a level of the dimming signal is greater than a preset value; and generating the first PWM control signal.

3. The method of claim 2, wherein the generating the PWM control signal comprises:

generating the chopping wave of the second driving frequency when the level of the dimming signal is less than the preset value; and generating the second PWM control signal.

4. The method of claim 2, wherein the preset value corresponds to a duty ratio of 2 percent or less.

5. The method of claim 1, wherein the generating the PWM control signal comprises:

generating the chopping wave of the first driving frequency when a level of the detection voltage is substantially equal to a preset value; and generating the first PWM control signal.

6. The method of claim 5, wherein the generating the PWM control signal comprises:

generating the chopping wave of the second driving frequency when the level of the detection voltage is different from the preset value; and generating the second PWM control signal.

7. A display apparatus comprising:

a display panel configured to receive an image signal and to display an image corresponding to the image signal;

a light-source module comprising a light-emitting diode ("LED") string, wherein the LED string comprises a plurality of LEDs connected to each other in series; and a light-source driving part comprising a main transistor and a control switching element connected to an end portion of the LED string, and configured to generate a pulse width modulation ("PWM") control signal having a current control pulse to control the control switching element, wherein the light-source driving part is configured to determine a duty ratio using a detection voltage detected from the end portion of the LED string, to generate the PWM control signal having the current control pulse of the duty ratio, and to adjust a driving frequency of the PWM control signal, the light-source module further comprises a frequency oscillating part which comprises a first resistor and generates a chopping wave, and the chopping wave has a driving frequency using a following Equation:

$$f_{op} = \frac{K}{R_{RT}[k\Omega]},$$

where K is a constant, and $R_{RT}$ denotes a resistance in kiloohm of the first resistor, wherein the light-source driving part comprises:

an image analyzing part configured to analyze the image signal and to determine a target luminance value of the LED string;

a dimming level determining part configured to determine a dimming signal of the LED string using the target luminance value; and the a driving signal generating part comprising the main transistor, configured to adjust a driving frequency of a boosting switching signal based on the dimming signal and configured to drive the main transistor in response to the boosting switching signal, wherein the driving signal generating part comprises:

the frequency oscillating part configured to generate the chopping wave;

a frequency modulating part configured to modulate the driving frequency of the chopping wave to the first driving frequency, or a second driving frequency higher than the first driving frequency, based on the dimming signal which controls luminance of the LED string; and a constant current control part configured to generate first or second PWM control signal including the current control pulse repeated with the first or second driving frequency in an enable period of the dimming signal based on the chopping wave of the first or second driving frequency, and wherein the frequency modulating part comprises:

an input part configured to receive the dimming signal;

a voltage dividing part configured to divide a voltage of the dimming signal;

a diode part connected to the input part and the voltage dividing part;

an oscillating transistor configured to operate in response to a divided voltage received from the voltage dividing part; and a resistor part comprising a second resistor connected in parallel to the first resistor of the frequency oscillating part, which determines the driving frequency of the chopping wave.

8. The display apparatus of claim 7, wherein a level of the dimming signal corresponds to a duty ratio of 2 percent or less.

* * * * *